United States Patent Office 3,193,591
Patented July 6, 1965

3,193,591
PROCESS FOR REMOVING BORON
COMPOUND DEPOSITS
Donald H. Belden, Prospect Heights, Ill., assignor to Universal Oil Products Company, Des Plaines, Ill., a corporation of Delaware
No Drawing. Filed July 13, 1961, Ser. No. 123,627
3 Claims. (Cl. 260—671)

This invention relates to a process for the removal of boron compound deposits from a reaction atmosphere, and more particularly relates to a process for the removal of boron compound deposits which tend to accumulate in a reaction atmosphere by reacting these deposits with a gaseous fluorine compound. Still more particularly, this invention relates to a process for removing boron compound deposits from a substantially anhydrous reaction atmosphere by reacting these deposits with a substantially anhydrous gaseous fluorine compound.

I have found that in the production of alkylated aromatic hydrocarbons utilizing a boron trifluoride-modified substantially anhydrous inorganic oxide catalyst, alkylatable aromatic hydrocarbon, olefin acting compound, and boron trifluoride, deposits comprising compounds of boron tend to form and accumulate in the reaction atmospheres. By way of definition and for the purpose of illustration only with no intention of unduly limiting the generally broad scope of this invention, the term "reaction atmospheres" shall include reactors, fractionating columns, separators, mass transfer devices, heat transfer devices, filters, pumps, fluid treating devices, and the like.

The principal object of the present invention is to provide a process for the efficient and economical conversion of boron compound deposits to volatile compounds in reaction atmospheres such as hereinabove mentioned. These reaction atmospheres may include the presence of gaseous or liquid hydrocarbons, such as an aromatic hydrocarbon comprising benzene, or higher homologs of benzene. The reaction atmosphere may be of a substantially anhydrous nature inasmuch as the effect of water would be detrimental to the desired reaction. Another object of this invention is to provide a process whereby the boron compound deposits can be removed continuously from the hereinabove mentioned reaction atmospheres and may be liberated without appreciable consumption and loss of other chemicals. Other objects of this invention will be set forth hereinafter as part of the specifications and in the accompanying examples.

In one embodiment, the present invention relates to a process for removing boron compound deposits from a reaction atmosphere which comprises reacting said deposits with a gaseous fluorine compound, thereby converting said deposits to volatile compounds of boron, and liberating said volatile compounds.

Another embodiment of the present invention relates to a process for removing boron compound deposits from a substantially anhydrous reaction atmosphere which comprises reacting said deposits with a substantially anhydrous gaseous fluorine compound, converting said deposits to volatile compounds of boron, and liberating said volatile compounds.

A further embodiment of the present invention relates to the removal of deposits comprising compounds of boron with a fluorine/boron mol ratio of less than 3.0 from a substantially anhydrous reaction atmosphere, reacting said deposits with a substantially anhydrous gaseous fluorine compound with a fluorine/boron mol ratio of at least 3.0, converting said deposits to volatile compounds of boron, and liberating said volatile compounds.

A still further embodiment of the present invention relates to the removal of deposits comprising compounds of boron with a fluorine/boron mol ratio of less than 3.0 from a substantially anhydrous reaction atmosphere, reacting said deposits with a substantially anhydrous gaseous fluorine compound with a fluorine/boron mol ratio of greater than 3.0, converting said deposits to volatile compounds of boron, and liberating said volatile compounds.

An additional embodiment of this invention relates to the removal of deposits comprising compounds of boron with a fluorine/boron mol ratio of less than 3.0 in the presence of an aromatic hydrocarbon from a substantially anhydrous reaction atmosphere, reacting said deposits with a substantially anhydrous gaseous fluorine compound with a fluorine/boron mol ratio of at least 3.0, converting said deposits to volatile compounds of boron, and liberating said volatile compounds.

A still further additional embodiment of this invention relates to the removal of deposits comprising compounds of boron with a fluorine/boron mol ratio of less than 3.0 in the presence of an aromatic hydrocarbon from a substantially anhydrous reaction atmosphere, reacting said deposits with a substantially anhydrous gaseous fluorine compound with a fluorine/boron mol ratio of greater than 3.0, converting said deposits to volatile compounds of boron, and liberating said volatile compounds.

Another embodiment of this invention relates to the removal of deposits comprising hydrates of boron oxides from a substantially anhydrous reaction atmosphere, reacting said deposits with substantially anhydrous hydrogen fluoride, converting said deposits to volatile compounds of boron, and liberating said volatile compounds.

A specific embodiment of this invention relates to the removal of deposits comprising hydrates of boron oxides in the presence of an aromatic hydrocarbon, such as benzene hydrocarbon from a substantially anhydrous reaction atmosphere at conditions including a temperature of from about 20° C. to about 230° C. and a pressure of from about atmospheric to about 200 atmospheres, reacting said deposits with substantially anhydrous hydrogen fluoride, converting said deposits to volatile compounds of boron, and liberating said volatile compounds.

Another embodiment of this invention relates to the removal of deposits comprising hydrates of boron oxides from a substantially anhydrous reaction atmosphere, reacting said deposits with substantially anhydrous boron trifluoride, converting said deposits to volatile compounds of boron, and liberating said volatile compounds.

A further specific embodiment of this invention relates to the removal of deposits comprising hydrates of boron oxides in the presence of an aromatic hydrocarbon such as a benzene hydrocarbon from a substantially anhydrous reaction atmosphere at conditions including a temperature of from about 20° C. to about 230° C. and a pressure of from about atmospheric to about 200 atmospheres, reacting said deposits with substantially anhydrous boron trifluoride, converting said deposits to volatile compounds of boron, and liberating said volatile compounds.

An additional specific embodiment of this invention relates to the removal of deposits comprising hydrates of boron oxides in the presence of an aromatic hydrocarbon, such as a benzene hydrocarbon from a substantially anhydrous reaction atmosphere at conditions including a temperature of from about 20° C. to about 230° C., and a pressure of from about atmospheric to about 200 atmospheres, reacting said deposits with a substantially anhydrous equimolecular mixture of hydrogen fluoride and boron trifluoride, converting said deposits to volatile compounds of boron, and liberating said volatile compounds.

Other embodiments of the present invention will become apparent in considering the specification as hereinafter set forth.

As set forth hereinabove, the present invention relates to a process for the removal of boron compound deposits from a reaction atmosphere, and more particularly relates to a process for the removal of boron compound deposits which tend to accumulate in a substantially anhydrous reaction atmosphere by reacting these deposits with a substantially anhydrous gaseous fluorine compound. I have found, that in the production of alkylated aromatics in the presence of a boron trifluoride-modified substantially anhydrous inorganic oxide catalyst, serious fouling of fractionating column reboiler tubes and plugging of columns due to accumulation of deposits on the fractionating trays is encountered. Inasmuch as the presence of water in the column seriously affects the operation of the column and reaction areas, particularly where the alkylation reaction is being carried out, I have found that the utilization of a substantially anhydrous gaseous fluorine compound injected in the column remedies the problem of fouling and plugging of the "reaction atmosphere" since the deposits are substantially removed, and continuous efficient production of the desired alkylated aromatic hydrocarbon results.

I have found that when these deposits that are accumulated in the reaction atmosphere on the trays of the column and in the reboiler tubes are analyzed, fluorine/boron mol ratios of usually less than 3.0 are found. These boron compound deposits include the oxides of boron, such as boron trioxide, etc., and the hydrates of boron oxides such as orthoboric acid, tetraboric acid, metaboric acid, etc. In addition to the hereinabove mentioned boron compound deposits, coordination compounds comprising boron, hydrogen, oxygen, and fluorine sometimes are encountered and are present as deposits as aforesaid. These compounds probably exist as $B(OH)_2F$, $B(OH)F_2$, etc., and are characterized in that the fluorine/boron mol ratio is less than 3.0. Intermediate solid but volatile materials such as $(BOF)_x$ polymers, where $x$ may be from 3 to 10 or more, are also sometimes encountered. The hereinabove mentioned boron compound deposits are sometimes encountered in combination with each other as well as singly. It will be appreciated by those skilled in the art, that the foregoing list of compounds has by no means exhausted the total number of boron compound deposits that may form in a reaction atmosphere. Such enumerations are intended to be exemplary only, and not limiting on the broad scope of the present invention.

Many suitable gaseous fluorine compounds are utilizable as deposit removal media in the process of this invention. These compounds include those with a single fluorine atom per molecule such as hydrogen fluoride, which even though it has a boiling point of 19.5° C., is defined to be gaseous in the process of this invention; those such as boron trifluoride with at least 3.0 fluorine atoms per molecule, and those such as an equimolecular mixture of hydrogen fluoride and boron trifluoride which has a fluorine/boron mol ratio of greater than 3.0. These hereinabove mentioned gaseous fluorine compounds may be utilized in the process of this invention either per se or in the presence of an inert diluent such as nitrogen or hydrocarbon. These gaseous fluorine compounds, depending upon the reaction atmosphere, may be utilized in anhydrous state, but, however, may also be utilized without being substantially anhydrous. It is preferred to use substantially anhydrous gaseous fluorine compounds when the reaction atmosphere is also substantially anhydrous. Substantially anhydrous gaseous fluorine compounds are preferred when these deposits exist in the presence of hydrocarbon in a substantially anhydrous atmosphere. Those hydrocarbons existing in these reaction atmospheres would include, for example, the aromatic hydrocarbons. These include benzene, toluene, ortho-xylene, meta-xylene, para-xylene, ethylbenzene, ortho-ethyl toluene, meta-ethyl toluene, para-ethyl toluene, 1,2,3-trimethylbenzene, 1,2,4-trimethylbenzene, 1,3,5-trimethylbenzene, normal propylbenzene, isopropylbenzene, etc. Preferred hydrocarbons are monocyclic aromatic hydrocarbons, that is, benzene hydrocarbons, and of the preferred benzene hydrocarbons, benzene itself is particularly preferred in the reaction atmosphere.

In accordance with the process of the present invention, the removal of boron compound deposits is effected in the presence of a substantially anhydrous gaseous fluorine compound at a temperature of from about 20° C. or lower to about 230° C. or higher, although the exact temperature needed will depend upon the particular reaction desired in the reaction atmosphere. The reacting or removal process is usually carried out at a pressure of from about substantially atmospheric to about 200 atmospheres. The pressure utilized is usually selected on the basis of the particular reaction desired in the reaction atmosphere.

The gaseous fluorine compound, at the hereinabove mentioned reaction conditions, reacts with the fluorine deficient boron compound deposits in such manner that the addition of fluorine atoms to said fluorine deficient deposits causes the deposits to volatilize and become liberated from equipment in the reaction atmosphere. In removing boron compound deposits to effect efficient operation of the reaction atmosphere thereof with the type of reacting or removal media herein described, either batch or continuous operations may be employed. The actual operation of the process may be either concurrent or countercurrent. The details of processes of this general character are familiar to those skilled in the art and any necessary additions or modifications of the above general procedures will be more or less obvious and can be made without departing from the broad scope of this invention.

The process of the present invention is illustrated by the following examples which are introduced for the purpose of illustration and with no intention of unduly limiting the generally broad scope of this invention.

*Example I*

This example illustrates the formation of boron compound deposits in a reaction atmosphere during the production of alkylated aromatics. The processing unit consisted of liquid and gas charge pumps, reactors, high pressure gas separators, pressure controllers, boron trifluoride treating system, feed pretreating system, fractionating columns, and liquid and gas collection systems. The catalyst charged to the reactors comprised a boron trifluoride-modified substantially anhydrous inorganic oxide, namely $BF_3$-modified $Al_2O_3$. The unit was started up according to standard procedures so that ethylbenzene was produced. Substantially pure boron trifluoride was charged to the unit in sufficient quantity along with substantially anhydrous benzene and ethylene so that the benzene was converted to ethylbenzene. Operating temperatures were held at a minimum consistent with good conversion. The operating pressure was selected so that the benzene was kept substantially in the liquid phase. The aromatic to olefin ratio was kept at a maximum at all times consistent with the equipment limitations, in order that few polyethylbenzenes should form. The fractionation section first separated part of the benzene recycle by flash and then the remainder by fractionation. The maximum recycle possible was hot flashed because of the lower heat requirement for flashing until the ethylbenzene and heavier present became a contamination factor. Most of the boron trifluoride present was in the effluent vapors from the flash. Part of this boron trifluoride was condensed with the hot flashed benzene recycle and returned to the reactor. The remaining boron trifluoride passed into the boron trifluoride treating system where it was absorbed and returned to the reactor by compressor after being stripped from the absorbent. The liquid from the hot flash was sent to the benzene fractionating column where after removal of the remaining recycle benzene in the benzene column overhead, the ethylbenzene and heavier from the benzene column bottoms was fractionated into an ethylbenzene cut in the overhead of ethylbenzene column, and a bottom cut. The overhead was sent to storage. The fractionator bottoms were recycled back to a second reactor where the polyethylbenzene was transalkylated to produce ethylbenzene.

During the production of ethylbenzene in the hereinabove outlined process flow scheme, serious fouling of benzene fractionator column reboiler tubes and plugging of columns due to accumulation of deposits on the fractionating trays was encountered. The benzene column operation became very unstable with poor fractionation resulting, and a pressure drop through the column was recorded. Additional heat input was required in the reboiler due to the inoperability of some of the tubes and hence less heat transfer area. Charge pumps and process lines also showed evidence of being partially plugged. Inasmuch as operation became erratic the plant was shut down. Upon analysis of the grayish-yellowish-white deposits formed in these various reaction atmospheres, it was found that they were boron compound deposits having a fluorine/boron mol ratio of less than 3.0. It was then theorized tht if the boron trifluoride present in the reaction atmosphere reacted with any trace quantities of water present, these type deposits would, in time, form. Formation of these deposits as hereinbefore stated, cause the eventual shut-down of the plant.

*Example II*

This example illustrates the removal of boron compound deposits from a reaction atmosphere during the production of alkylated aromatics. The same processing unit described in Example I was also utilized for the experiment described in this example.

The benzene fractionating column was modified so that a substantially anhydrous equimolecular mixture of hydrogen fluoride and boron trifluoride was introduced into the column below the feed deck. The boron compound deposits that had formed on the trays of the column, and in the reboiler tubes, as hereinbefore mentioned, reacted with the mixture of hydrogen fluoride and boron trifluoride so that these fluorine deficient boron trifluoride compound deposits were substantially volatilized, and liberated from the reaction atmosphere. The benzene column was then operated at the desired fractionation conditions with the hydrogen fluoride-boron trifluoride injection, continuously, until the plant was shut down at the conclusion of the run. Formation of additional boron compound deposits were substantially eliminated while the hydrogen fluoride-boron trifluoride mixture was added to the column inasmuch as visual inspection of the reboiler tubes and fractionating trays after the run was completed showed that no fouling had occurred.

The above results indicated satisfactory conversion of the boron compound deposits to volatile compounds of boron by the process of this invention utilizing the equimolecular mixture of hydrogen fluoride and boron trifluoride as the deposit removal media.

*Example III*

This example illustrates the removal of boron compound deposits from a reaction atmosphere utilizing substantially anhydrous boron trifluoride as the deposit removal media utilizing the processing equipment described in Example I.

Substantially anhydrous boron trifluoride was introduced into the benzene column before the feed deck of the column in a run where grayish-white deposits, analyzed as having a fluorine/boron mol ratio of less than 3.0, were observed. The boron trifluoride reacted with these boron compound deposits and they were substantially volatilized and liberated from the reaction atmosphere. The benzene column was again operated at the desired fractionation conditions with the boron trifluoride injection, continuously, until the plant was shut down at the conclusion of the run. Formation of additional boron compound deposits was substantially eliminated when the boron trifluoride was added to the column inasmuch as visual inspection of the reaction atmosphere showed substantially no deposition of solids.

The above results indicate a satisfactory conversion of the boron compound deposits to volatile compounds of boron by the process of this invention utilizing the substantially anhydrous boron trifluoride as a deposit removal agent.

*Example IV*

This example illustrates the removal of boron compound deposits from a reaction atmosphere utilizing substantially anhydrous gaseous hydrogen fluoride as the deposit removal media utilizing the processing equipment hereinbefore described in Example I.

Substantially anhydrous gaseous hydrogen fluoride was introduced into the benzene column below the feed deck of the column in a run where grayish-white deposits were again observed. The hydrogen fluoride reacted with these boron compound deposits and substantially volatilized them, liberating them from the reaction atmosphere. The benzene column was still again operated at the desired fractionation conditions with the hydrogen fluoride injection, continuously, until the plant was shut down at the end of the run. Formation of additional boron compound deposits were substantially eliminated while the hydrogen fluoride was added to the column inasmuch as visual inspection of the reaction atmosphere again showed substantially no deposition of solid material.

The above results indicate a satisfactory conversion of the boron compound deposits to volatile compounds of boron by the process of this invention utilizing the substantially anhydrous hydrogen fluoride as the deposit removal agent.

*Example V*

This example illustrates the removal of boron compound deposits from a reaction atmosphere comprising an 800 cc. autoclave. Boron compound deposits are formed by the interaction of boron trifluoride and water so that a grayish-white deposit is formed. An equimolecular mixture of hydrogen fluoride and boron trifluoride is introduced into the reaction atmosphere at 200° C. and 500 p.s.i.g. pressure. Evolution of volatile compounds is recorded by means of a gas collection system. Upon visual examination of the autoclave, the deposits are found to be substantially removed.

I claim as my invention:

1. In a process wherein a boron compound deposit having a fluorine/boron mol ratio of less than 3 is formed in apparatus in which a catalytic reaction is effected in the presence of boron trifluoride as a catalyst component, the method of removing said deposit which comprises introducing to the apparatus, in addition to said $BF_3$ catalyst component, a sufficient amount of a substantially anhydrous gaseous fluorine-containing reagent selected from the group consisting of hydrogen fluoride, boron trifluoride and an equimolecular mixture of hydrogen fluoride and boron trifluoride to react with and substantially vaporize said deposit as a volatile boron compound, and removing the resultant vapor from the apparatus.

2. In a catalytic conversion process performed in the presence of boron trifluoride as a catalyst component, followed by fractionation of resultant $BF_3$-containing products in a fractionating column wherein there is formed a boron compound deposit having a fluorine/boron mol ratio of less than 3, the method of removing said deposit from the fractionating column which comprises introducing to the column, in addition to the $BF_3$ content of said products, a sufficient amount of a substantially anhydrous gaseous fluorine-containing reagent selected from the group consisting of hydrogen fluoride, boron trifluoride and an equimolecular mixture of hydrogen fluoride and boron trifluoride to react with and substantially vaporize said deposit as a volatile boron compound, and removing the resultant vapor from the apparatus.

3. In the alkylation of aromatic hydrocarbons in the presence of boron trifluoride, followed by fractionation of resultant $BF_3$-containing products in a fractionating column wherein there is formed a boron compound deposit having a fluorine/boron mol ratio of less than 3, the method of removing said deposit from the fractionating column which comprises introducing to the column, in addition to the $BF_3$ content of said products, a sufficient amount of a substantially anhydrous gaseous fluorine-containing reagent selected from the group consisting of hydrogen fluoride, boron trifluoride and an equimolecular mixture of hydrogen fluoride and boron trifluoride to react with and substantially vaporize said deposit as a volatile boron compound, and removing the resultant vapor from the apparatus.

References Cited by the Examiner

UNITED STATES PATENTS 2,803,682 8/57 McCaulay et al. _____ 260—671
2,939,890 6/60 Hervert et al. _____ 260—671

ALPHONSO D. SULLIVAN, *Primary Examiner.*